Patented July 23, 1935

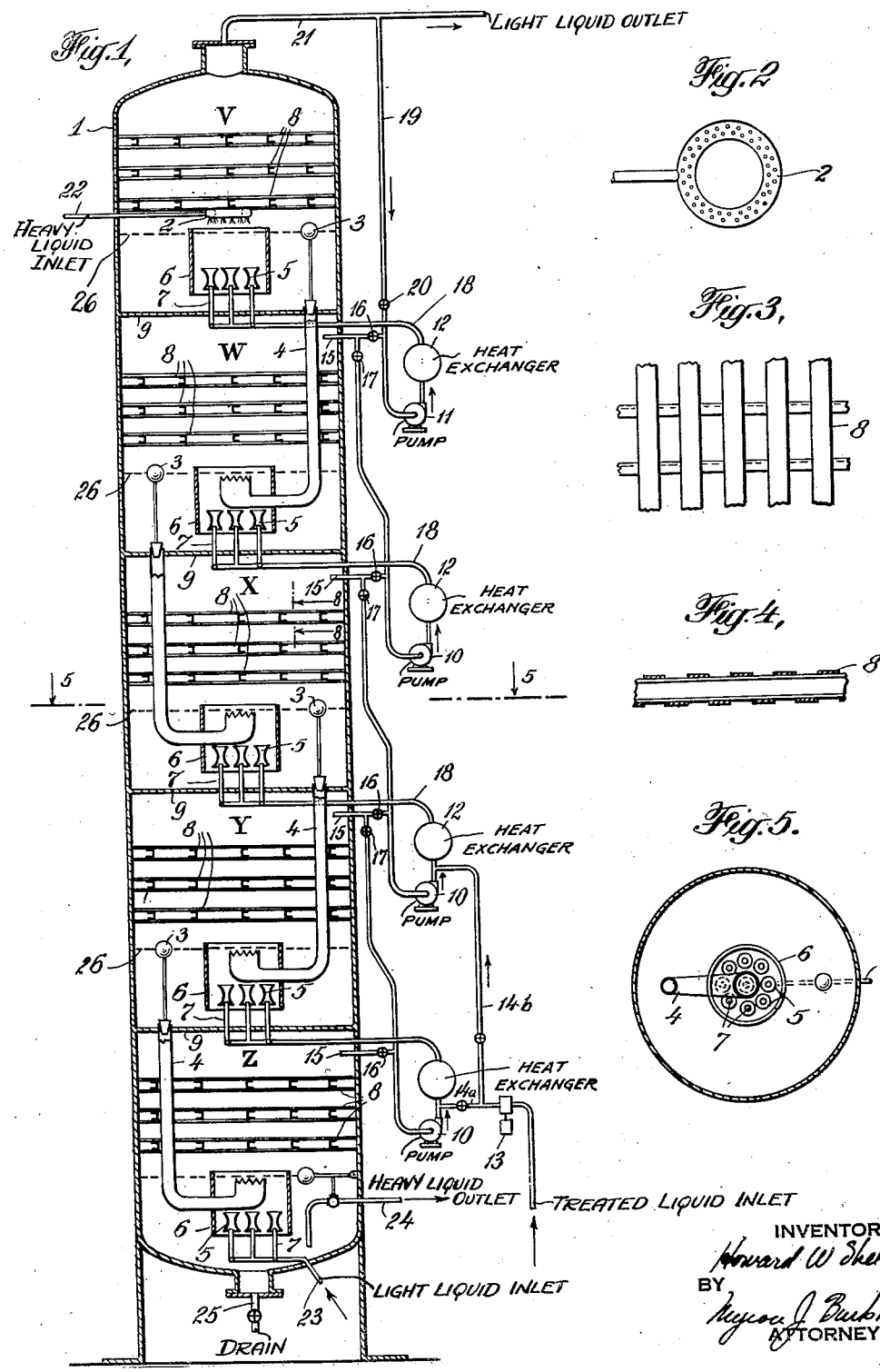

2,009,347

UNITED STATES PATENT OFFICE 2,009,347

APPARATUS FOR CONTACTING LIQUIDS

Howard W. Sheldon, Haddonfield, N. J., assignor to Socony-Vacuum Oil Company, Incorporated, New York, N. Y., a corporation of New York Application March 9, 1935, Serial No. 10,133

12 Claims. (Cl. 23—270)

This invention has to do broadly with the art of treating liquids by contacing them with other liquids, the reagent liquid being to a great degree immiscible with the treated liquid and differing therefrom in specific gravity in a degree sufficient to enable separation of the two liquids by gravity.

Operations of this general type occur very widely in chemical processes. They are very frequently used in the refining of oils, as for instance in the contacting of petroleum distillates with sulphuric acid or with alkaline solutions, or with other reagents for similar purposes. The field of such typical operations has recently been extended into the refining of the heavier petroleum distillates intended for lubricants, and it is specifically with an apparatus adapted for this latter type of work that this invention has to do, although the equipment is likewise applicable for any of the other purposes of refining, or even for similar operations carried out in analogous arts in other industries.

One of the more typical of the new uses of the general art of contacting liquids and liquids may be explained by reference to Tuttle U. S. Patent #1,912,349, wherein a method for the separation of mineral oil constituents of different characteristics is described. In this disclosure of Tuttle's, the process is one in which it is intended to separate a petroleum distillate fraction in the lubricant oil range into two fractions, one relatively more highly "paraffinic", and the other more highly "naphthenic" in character. These two fractions are separated by taking advantage of the fact that cresylic acid exhibits a preferential solvent power for the "naphthenic" fraction and is immiscible with and heavier than the remaining "paraffinic" fraction, while a second sol-vent or agent, namely propane, is preferentially solvent for the "paraffinic" fraction and when so admixed therewith renders such fraction more highly immiscible with, and more greatly different in specific gravity from the cresylic acid solution. To take advantage of these characteristics, a counterflow extraction system is set up in which the oil to be treated is introduced at the middle, with cresylic acid introduced at the top and flowing downwardly througn the system to collect in itself and extract the "naphthenic" fraction, while propane is introduced at the bottom to flow upwardly, collect in itself and remove from the system the "paraffinic" fraction. The process and apparatus herein disclosed is most specifically adapted to operations of this general type, wherein an oil is treated simultaneously with two solvents flowing countercurrently, and its operation will be so described, without however, limiting it to that operation only, since it is equally applicable with or without modifications to many, if not all, of the commonly used operations wherein liquids are contacted with liquids.

In previous apparatus for the purpose above indicated, use has been made of a structure identical with the normal bubble tower construction wherein gases are contacted with liquids. Similarly the analogous device of a vertical column packed with tile, crockery, broken stone or other materials has been used. The treatment has also been broken up into a series of step-wise operatio.is carried out in individual chambers, which have variously been placed side by side, superimposed one upon another, or arranged in various physical formations. Many of these previous attempts to devise equipment and process for this purpose have been quite cumbersome and ineffective for the purpose intended in that they are unable to secure efficient control of the process steps required.

It is an object of this invention to devise novel apparatus whereby and wherein the process of contacting a liquid to be treated with another liquid, largely immiscible therewith, and differing therefrom in specific gravity may be carried out with a maximum of efficiency and a minimum of waste. It is a further object to devise such apparatus capable of permitting accurate control of the operation above outlined. A further object is the devising of an apparatus wherein intimate mixing, separation, recirculation and remixing may be carried out in a minimum of space, and such other objects and advantages as may hereinafter appear.

All of these objects and advantages are obtained by operation in the apparatus herein disclosed, for the more convenient description of which I will now refer to the drawing, which is attached to and made a part of this specification.

In this drawing, Figure 1 is an elevation of my apparatus shown in sections. Figure 2 is a detail of a part therein. Figures 3 and 4 are details of other parts, and Figure 5 is a sectional view taken on plane A—A of Figure 1. Referring now to Figure 1, the numeral 1 designates the outer shell of a tower divided by internal partitions 9 into any desired number of vertical sections. In this case five of such sections, designated by the letters V, W, X, Y and Z are shown. The construction in each of these sections is identical, the whole of the details being shown only in section X, and various details of the equipment being shown individually in the other sections for greater clarity. Similar equipment in each section is identical and is numbered in each case with like numbers.

Each of these chambers is designed to be operated completely full of liquid, and serves as a combined mixing and settling chamber wherein the treated liquid and reagent liquid are first mixed within a cylindrical chamber vertically disposed in a central position in the lower part of each chamber and designated by the numeral 6, the mixed liquids then separating in the upper section of the chamber, the lighter liquid rising and the heavier liquid settling to form an effective interface at the level designated by 26 in each chamber. A float valve shown diagrammatically and designated by the character 3 is provided to control and collect the withdrawal of the heavier liquid to maintain this level 26, the float valve 3 communicating with a downflow pipe 4, which passes into the next lower chamber, and passes therefrom into the central mixing tube 6, ending therein in an upturned distributing head. In this central mixing tube 6, below the upturned end of tube 4, there are placed several Venturi or jet mixing devices, designated by the numeral 5, each being fed with light liquid from the jet pipes 7, which communicate with the pipe 18, the purpose of which is to introduce the lighter or treated oil into the mixing chamber. In the upper portion of each chamber, well above the top of the central mixing tube 6, there is placed a plurality of baffle members 8, each composed of horizontally placed narrow strips of iron or other material alternating vertically to compel the liquid ascending through this portion of the space to assume a zigzag path, and to flow slowly, so that it may separate; these baffles also affording a surface whereon separated material may accumulate or agglomerate. A detail of the arrangement of these baffles is shown in Figures 3 and 4, a plan and an elevation respectively, which are believed to be thoroughly self-explanatory. In each of these chambers just described, the functions of the parts which have been described is probably best explained by a description of the detailed operation within the chamber. It will be remembered that the purpose of the chamber is to first mix and then separate two immiscible liquids differing in specific gravity. The heavier liquid enters from above through tube 4, and is carried into central mixing tube 6. The lighter liquid enters through jet pipe 7, passes through Venturi mixers 5, through central mixing tube 6, contacts with incoming heavy liquid from 4 in central mixing tube 6, and the mixed liquids pass upwardly into the baffled area wherein their separation is promoted by the baffles 8, the light liquid then collecting in the top of the chamber, and the heavy liquid collecting in the bottom. A certain portion of this heavy liquid is recirculated by pasisng under the lower edge of central mixing tube 6, and being entrained in the Venturi mixers 5. The level of the heavy liquid is maintained within the chamber by the exit valve 3.

This description serves for all chambers, except those at the extreme top and extreme bottom. In the case of the chamber V in the extreme top, the heavy liquid is introduced through a spray head of any desired shape, such as for instance, that designated by the numeral 2, and shown in more detail in Figure 2, this spray head being fed by a line 22, which may be valved for the control of the heavy reagent liquid. The separated light liquid rises to the top of the tower and passes from the system through line 21. In the chamber Z, at the extreme bottom, the difference is that a light liquid entering through jets 7 is supplied by a valved line 23, leading from an outside source, and the valve 3 and tube 4 are replaced by a similarly controlled valve 3A and a pipe 24, the purpose of which is to remove the heavy reagent liquid from the system. The bottom of chamber Z is also provided with a drain 25.

In any typical intermediate section, as for instance section X, the separated light treated liquid is withdrawn through a horizontal line 15, this line being divided and valved as at 16 and 17. The portion of the oil passing through valve 16, enters pump 10, is forced thence through heat exchanger 12 and line 18 to jets 7 in the next succeeding chamber. If it is desired to recirculate a portion of the light liquid separated in chamber X, back to that same chamber X, this portion of that liquid is diverted from line 16 through valve 17, passing through a similar pump and heat exchanger, (there being one of these set-ups for each of the sections, except the one at the extreme top) to be delivered again to the jets 7 in the bottom of the chamber from which it was withdrawn. It will be seen that this set-up of recirculation lines, pumps and jets, enables an extensive controlled contact of the oil to be treated and the heavier reagent liquid in chamber X, even though that chamber might at the time be isolated from the rest of the system, and there might be no further new untreated liquid entering through jets 7, or no further heavy reagent liquid entering through line 4. With proper adjustment of the valve 16, of the valve in line 22, which controls the entry of heavy reagent liquid to the system, and control of the valve 23 which admits a light liquid to the system, the apparatus herein shown may effectively bring about any desired degree of interaction between the two liquids which might in this case for instance be an oil to be acid treated entering through line 23, and an acid to treat said oil entering through line 22.

In applying this apparatus to the process more completely described in Tuttle #1,912,349, the oil to be treated is introduced intermediate the ends of the treating system. For this purpose a raw oil feed pump 13 is provided, equipped with valved lines 14a and 14b, through which all or any desired portion of the oil may be fed to either chamber X or chamber Y. In some cases, it is desirable to extend line 14b so that the oil may be distributed in any of the intermediate chambers, as for instance, into chamber W. In this method of operation, however, it is not common, or even generally desirable to introduce the raw oil into either of the end chambers, since these have definite functions to perform, which would be disturbed by the entrance of such oil. In carrying out the method of Tuttle, cresylic acid would be introduced through the valved line 22, and liquid propane would be introduced through the valved line 23.

Now, to illustrate how the method of Tuttle is carried out in this apparatus, we may proceed from the bottom upward, beginning with chamber Z, the extreme bottom chamber. In this chamber the heavy liquid which is introduced is a mixture of naphthenic oil constituents and cresylic acid containing some entrained paraffinic constituents. In the bottom chamber it meets pure propane and a desired degree of contacting and recirculation is effected through the operation of the equipment installed therein, the propane acting to remove from the heavy liquid a considerable portion of the paraffinic constituents entrained therein, much in the same manner as steam in the bottom of a bubble tower removes light ends from residual liquid. In chamber Y, we come to a section the operation of which is analogous somewhat to the feed plate of a bubble tower, wherein raw oil mixed with separated propane, etc. from the section next below, enters chamber Y through jets 7 at its bottom, to be met by descending heavy reagent, which contains a considerable amount of naphthenic constituents, entering chamber Y through line 4 from chamber X, which is next above. In this chamber Y, a desired amount of recirculatory contact may be had independently of the amount of entering liquid and/or reagent, and after sufficient treatment for this particular step, the propane plus paraffinic constituents departs through line 15 and subsequent pump and lines to the chamber X next above, while the cresylic acid plus naphthenic constituents departs to the chamber next below through the agency of the valve 3 and tube 4. Similar operations are carried out in all of the intermediate chambers, a sufficient series of steps or number of chambers being provided to obtain the desired reaction. In each chamber, in ascending order, an oil increasingly leaner in naphthenic constituents meets a cresylic acid less rich in such constituents and in the descending order in each chamber a mixture of cresylic acid and naphthenic constituents less rich in paraffinic constituents meets a liquid propane more capable of extracting the paraffines therefrom. In the upper chamber, designated by V, the incoming light liquid is a mixture of propane and paraffinic constituents, containing some naphthenic constituents. This is contacted with fresh cresylic acid entering through spray head 2, and the naphthenic constituents are removed and passed down the tower in a manner very analogous to the operation at the top of a bubble tower fractionator, the cresylic acid performing a somewhat similar function to a stream of wet reflux. Separated propane plus completely refined paraffinic constituent is removed through line 21 to depart from the system. A sufficient amount however, is returned through line 19, and valve 20 to pump 11 which serves the topmost compartment in the same way in which pumps 10 serve the other compartments.

The control of temperature in an operation of this kind is quite frequently of major importance, and for this purpose I have provided heat exchangers 12, in the outflow line of each of the transfer-recirculation pumps 10 and 11. These heat exchangers may be cooled or heated and any desired temperature level of reaction may be held in the chambers which they serve, thus rendering it possible to vary the temperature level from stage to stage as desired, or to closely hold the entire system at a given optimum temperature.

I claim:

1. An apparatus for the continuous countercurrent contacting of two liquids substantially immiscible and differing in specific gravity which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, said conduit terminating in jet means within the mixing tube in said next higher vessel, an entrainment means mounted on each of said jets, and similar jet means and entrainment means on the light liquid inlet in the lowest chamber.

2. An apparatus for the continuous countercurrent contacting of two liquids substantially immiscible and differing in specific gravity which comprises: a plurality of vessels arranged in a rising order, the upper most vessel being provided with a controlled means for the admission of fresh heavy liquid and an outlet for light liquid near its top, the lowest vessel being provided with an outlet for heavy liquids near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, said conduit terminating in jet means within the mixing tube in said next higher vessel, an entrainment means mounted on each of said jets, similar jet means and entrainment means on the light liquid inlet in the lowest chamber, and on each vessel, conduit means whereby a portion of said light liquid may be returned to the inlet jets at the bottom of the vessel.

3. An apparatus for the continuous countercurrent contacting of two liquids substantially immiscible and differing in specific gravity which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, in each of said conduits a heat exchanger following the pressure means, said conduit terminating in jet means within the mixing tube in said next higher vessel, an entrainment means mounted on each of said jets, and similar jet means and entrainment means on the light liquid inlet in the lowest chamber.

4. An apparatus for the continuous countercurrent contacting of two liquids substantially immiscible and differing in specific gravity which comprises: a plurality of vessels arranged in a rising order, the uppermost vessel being provided with a controlled means for the admission of fresh heavy liquid and an outlet for light liquid near its top, the lowest vessel being provided with an outlet for heavy liquids near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, in each of said conduits a heat exchanger following the pressure means, said conduit terminating in jet means within the mixing tube in said next higher vessel, an entrainment means mounted on each of said jets, similar jet means and entrainment means on the light liquid inlet in the lowest chamber, and on each vessel, conduit means whereby a portion of said light liquid may be returned to the inlet jets at the bottom of the vessel.

5. An apparatus for the continuous countercurrent contacting of two liquids substantially immiscible and differing in specific gravity which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, said conduit terminating in jet means within the mixing tube in said next higher vessel, an entrainment means mounted on each of said jets, similar jet means and entrainment means on the light liquid inlet in the lowest chamber, and in each vessel, baffle means disposed in the upper portion of said vessel.

6. Apparatus for the continuous countercurrent treatment of a liquid with two other liquids, one a heavy liquid and one a light liquid, for partition of the first-named liquid between said other liquids, said light liquid and said heavy liquid being substantially immiscible and differing in specific gravity, which comprises: a plurality of vessels arranged in a rising order, the uppermost vessel being provided with a controlled means for the admission of fresh heavy liquid and an outlet for light liquid near its top, the lowest vessel being provided with an outlet for heavy vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel, in the lowest and each intermediate vessel an outlet near its top for separated light liquid, a conduit and pressure means to transfer said light liquid from said outlet to the vessel next higher, said conduit terminating in jet means within the mixing tube in said next higher vessel, an entrainment means mounted on each of said jets, similar jet means and entrainment means on the light liquid inlet in the lowest chamber, and means to introduce the first liquid to be treated into one or more intermediate vessels.

7. Apparatus for the continuous countercurrent treatment of a liquid with two other liquids, one a heavy liquid, and one a light liquid, for partition of the first-named liquid between said other liquids, said light liquid and said heavy liquid being substantially immiscible and differing in specific gravity, which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, said conduit terminating in jet means within the mixing tube in said next higher vessel, an entrainment means mounted on each of said jets, similar jet means and entrainment means on the light liquid inlet in the lowest chamber, on each vessel conduit means whereby a portion of said light liquid may be returned to the inlet jets at the bottom of the vessel, and means to introduce the first liquid to be treated into one or more intermediate vessels.

8. Apparatus for the continuous countercurrent treatment of a liquid with two other liquids, one a heavy liquid and one a light liquid, for partition of the first-named liquid between said other liquids, said light liquid and said heavy liquid being substantially immiscible and differing in specific gravity, which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, in each of said conduits a heat exchanger following the pressure means, said conduit terminating in jet means within the mixing tube in said next higher vessel, an entrainment means mounted on each of said jets, similar jet means and entrainment means on the light liquid inlet in the lowest chamber, and means to introduce the first liquid to be treated into one or more intermediate vessels.

9. Apparatus for the continuous countercurrent treatment of a liquid with two other liquids, one a heavy liquid, and one a light liquid for partition of the first-named liquid between said other liquids, said light liquid and said heavy liquid being substantially immiscible and differing in specific gravity, which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, in each of said conduits a heat exchanger following the pressure means, said conduit terminating in jet means within the mixing tube in said next higher vessel, an entrainment means mounted on each of said jets, similar jet means and entrainment means on the light liquid inlet in the lowest chamber, on each vessel conduit means whereby a portion of the said light liquid may be returned to the inlet jets at the bottom of the vessel, and means to introduce the first liquid to be treated into one or more intermediate vessels.

10. Apparatus for the continuous countercurrent treatment of a liquid with two other liquids, one a heavy liquid and one a light liquid, for partition of the first-named liquid between said other liquids, said light liquid and said heavy liquid being substantially immiscible and differing in specific gravity, which comprises: a plurality of vessels arranged in a rising order, the uppermost vessel being provided with a controlled means for the admission of fresh heavy liquid and an outlet for light liquid near its top, the lowest vessel being provided with an outlet for heavy liquid near its bottom and an inlet for light liquid, the top vessel and each intermediate vessel being provided with heavy liquid outlet means whereby heavy liquid may be transferred to the vessel next lower, control means for each of said outlets capable of acting to maintain a determined accumulated amount of heavy liquid in each vessel, in the lower portion of the lowest and each intermediate vessel a vertically disposed open ended mixing tube maintained in a spaced position above the bottom and extending above the maintained level of heavy liquid, within said mixing tube a distributor head defining the outlet of the heavy liquid transfer means from the vessel next above, a similar mixing tube in the topmost vessel, in the lowest and each intermediate vessel an outlet near its top for separated light liquid, a conduit and pressure means to transfer said light liquid from said outlet to the vessel next higher, said conduit terminating in jet means within the mixing tube in said next higher vessel, an entrainment means mounted on each of said jets, similar jet means and entrainment means on the light liquid inlet in the lowest chamber, means to introduce the first liquid to be treated into one or more intermediate vessels, and in each vessel, baffle means disposed in the upper portion of said vessel.

11. Apparatus for the continuous countercurrent treatment of a liquid with two other liquids, one a heavy liquid and one a light liquid, for partition of the first-named liquid between said other liquids, said light liquid and said heavy liquid being substantially immiscible and differing in specific gravity, which comprises: a plurality of vessels arranged in rising order, the uppermost vessel provided with an inlet for heavy liquid and an outlet for light liquid near its top, said uppermost vessel further provided at a point near its bottom with an outlet for heavy liquid discharging into the next lower vessel at a point near its bottom, the lowermost vessel provided with a valve-controlled outlet for heavy liquid, the lowermost vessel further provided with a pipe conveying light liquid under pressure into the vessel and an injector into which such pipe discharges, the lowermost and each intermediate vessel being further provided with a pipe connection between its upper end and the next upper vessel, and an injector into which said connecting pipe discharges, said respective injectors opening on the suction side into the respective upper vessels near their bottoms, and means whereby said first-named liquid to be treated may be delivered into one or more intermediate vessels.

12. Apparatus of the class described, comprising an upper chamber, a lower chamber, and at least one intermediate chamber, inlet means for heavy liquid to and outlet means for light liquid from the upper chamber, outlet means for heavy liquid from and inlet means for light liquid to the lower chamber, means for transferring heavy liquid from the lower portion of a chamber into the lower portion of the next lower chamber, means for maintaining a predetermined level of heavy liquid in a chamber, means for transferring light liquid from the upper portion of a chamber into the lower portion of the next higher chamber, means for effecting mixing of light and heavy liquids in the respective chambers, and means for introducing a liquid to be partitioned between said light and heavy liquids into an intermedate chamber.

HOWARD W. SHELDON.